(12) United States Patent
Chien et al.

(10) Patent No.: US 7,982,768 B2
(45) Date of Patent: Jul. 19, 2011

(54) DRIVER-ASSISTING APPARATUS

(76) Inventors: Cimb Chien, Taichung (TW); Eric Chien, Taichung (TW)

(*) Notice: Subject to any disclaimer, the term of this patent is extended or adjusted under 35 U.S.C. 154(b) by 1449 days.

(21) Appl. No.: 11/047,033

(22) Filed: Jan. 31, 2005

(65) Prior Publication Data
US 2006/0170771 A1  Aug. 3, 2006

(51) Int. Cl.
*H04N 7/18* (2006.01)
*H04N 5/228* (2006.01)

(52) U.S. Cl. .................... 348/148; 348/208.16

(58) Field of Classification Search .......... 348/148, 348/143, 54, 341, 240, 333.01, 333.04, 333.13, 348/149, 118, 159, 208.16, 208.6, 222.1, 348/208.14, 211.9; 340/461, 435, 436, 438, 340/439, 901, 903, 462
See application file for complete search history.

(56) References Cited

U.S. PATENT DOCUMENTS

| | | | | |
|---|---|---|---|---|
| 5,949,331 A | * | 9/1999 | Schofield et al. | 340/461 |
| 6,262,848 B1 | | 7/2001 | Anderson et al. | 359/630 |
| 6,411,874 B2 | * | 6/2002 | Morgan et al. | 701/36 |
| 6,538,622 B1 | * | 3/2003 | Kojima et al. | 345/7 |
| 6,727,807 B2 | * | 4/2004 | Trajkovic et al. | 340/436 |
| 7,538,795 B2 | * | 5/2009 | Shibatani et al. | 348/208.16 |
| 2001/0003464 A1 | * | 6/2001 | Niikawa | 348/341 |
| 2001/0034573 A1 | * | 10/2001 | Morgan et al. | 701/36 |
| 2004/0036769 A1 | * | 2/2004 | Sadahiro | 348/148 |
| 2004/0201672 A1 | * | 10/2004 | Varadarajan et al. | 348/148 |
| 2005/0125121 A1 | * | 6/2005 | Isaji et al. | 701/36 |
| 2005/0146458 A1 | * | 7/2005 | Carmichael et al. | 342/52 |

FOREIGN PATENT DOCUMENTS
JP  07-304390  * 11/1995
* cited by examiner

*Primary Examiner* — Behrooz Senfi
(74) *Attorney, Agent, or Firm* — Alan Kamrath; Kamrath & Associates PA (57) ABSTRACT

A driver-assisting apparatus includes a video camera and a display. The video camera is attached to a vehicle for taking pictures in a field further than a driver's field of view with bare eyes. The display is connected with the camera for displaying the pictures. With the driver-assisting apparatus, the driver can see an object that is too far for her or him to see with the bare eyes. Thus, the driver can take actions to avoid running over or bumping into the object earlier with the driver-assisting apparatus than without.

11 Claims, 10 Drawing Sheets

Fig.10

DRIVER-ASSISTING APPARATUS

BACKGROUND OF INVENTION

1. Field of Invention

The present invention relates to a driver-assisting apparatus.

2. Related Prior Art

On highways or racing tracks, drivers drive vehicles fast. The faster they drive, the harder it is for drivers to respond to situations in time. This can be attributed to at least two reasons. Firstly, as the speed of a vehicle gets higher, the maneuvering of the vehicle gets harder. Secondly, as the speed of a vehicle gets higher, less time is left for its driver to take necessary actions in response to a situation.

The present invention is hence intended to obviate or at least alleviate the problems encountered in the prior art.

SUMMARY OF INVENTION

According to the present invention, a driver-assisting apparatus is disclosed. The driver-assisting apparatus includes a video camera and a display. The video camera is attached to a vehicle for taking pictures in a field further than a driver's field of view with bare eyes. The display is connected with the camera for displaying the pictures.

The primary advantage of the driver-assisting apparatus of the present invention is that it enables a driver to see an object that is too far for her or him to see directly. Thus, the driver can take actions to avoid running over or bumping into the object earlier with the driver-assisting apparatus than without.

Other advantages and novel features of the invention will become more apparent from the following detailed description in conjunction with the attached drawings.

BRIEF DESCRIPTION OF DRAWINGS

The present invention will be described via detailed illustration of embodiments referring to the drawings.

DETAILED DESCRIPTION OF EMBODIMENTS

Figure 1:
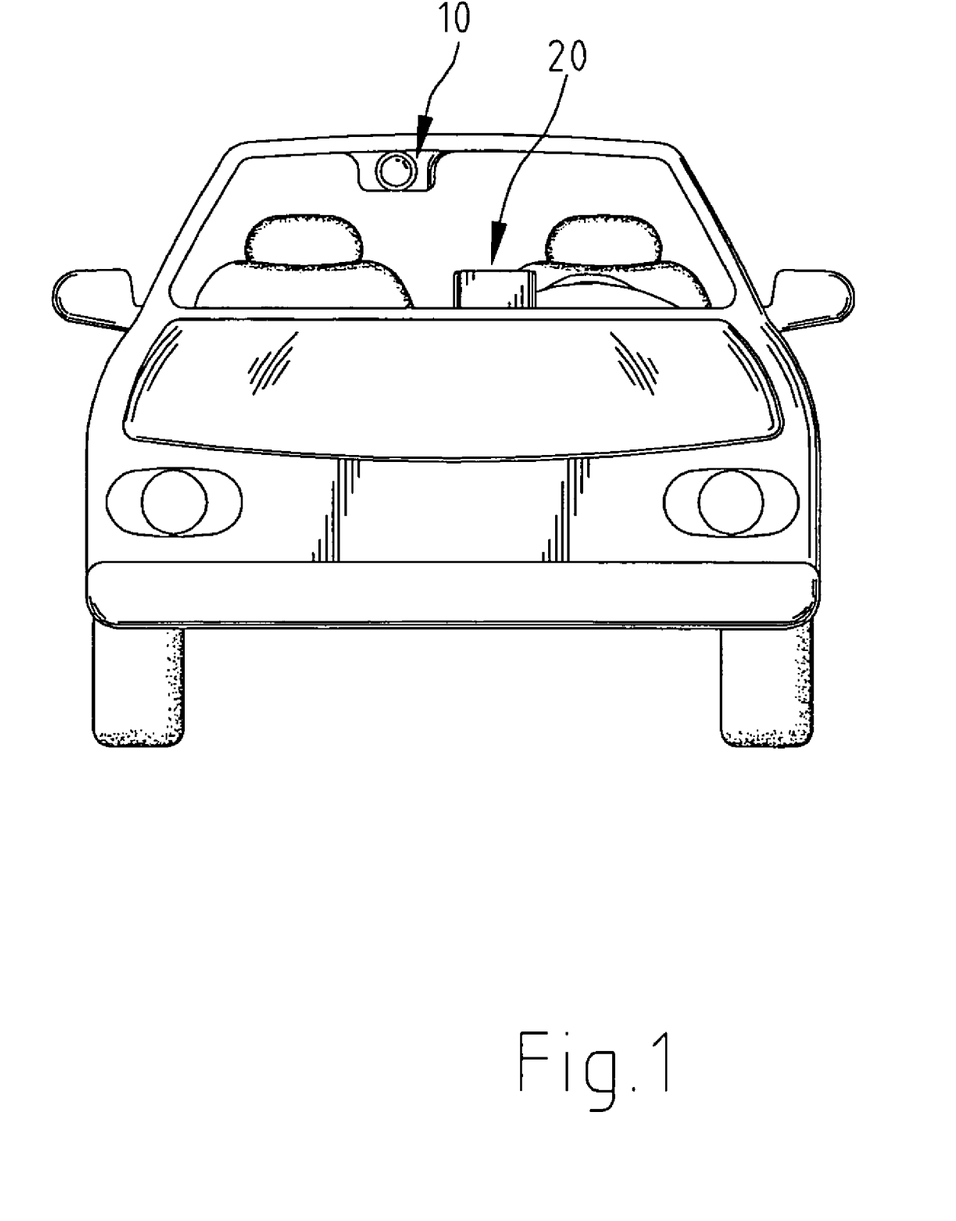
FIG. 1 is a front view of a sedan equipped with a driver-assisting apparatus according to a first embodiment of the present invention.

Referring to FIG. 1, a sedan is equipped with a driver-assisting apparatus according to a first embodiment of the present invention. The driver-assisting apparatus includes a video camera 10 and a display 20. The video camera 10 is used to take pictures in a field ("camera field of view") further than a driver's field of view with bare eyes ("driver's field of view"). The display 20 is used to display the pictures. The display 20 is located near the driver's seat so that it takes little time for a driver to take his or her eyes off a field of view in front of the sedan to the display 20, and vice versa.

The video camera 10 is preferably a charge-coupled device ("CCD") camera. The focus of the video camera 10 is preferably adjusted based on the speed of the sedan. In other words, the camera field of view is adjusted based on the speed of the sedan. More particularly, as the speed of the sedan gets higher, the camera field of view is moved further from the driver's field of view. As the sedan is started, the camera field of view overlaps with the driver's field of view in an area ("overlap"). As the speed of the sedan gets higher, the overlap gets smaller. Yet, there should be no gap between the camera field of view and the driver's field of view.

Figure 2:
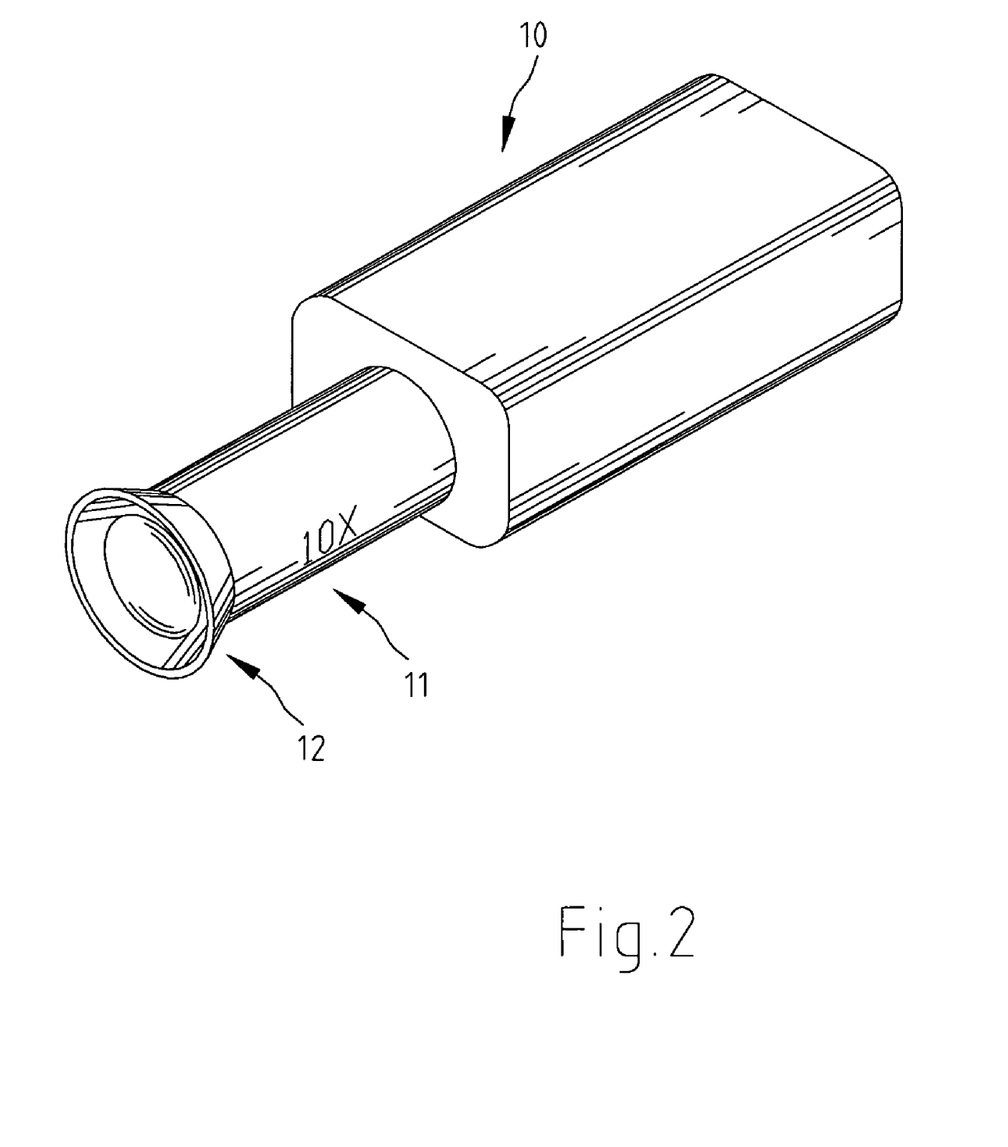
FIG. 2 is a perspective view of a video camera of the driver-assisting apparatus shown in FIG. 1.
Figure 3:
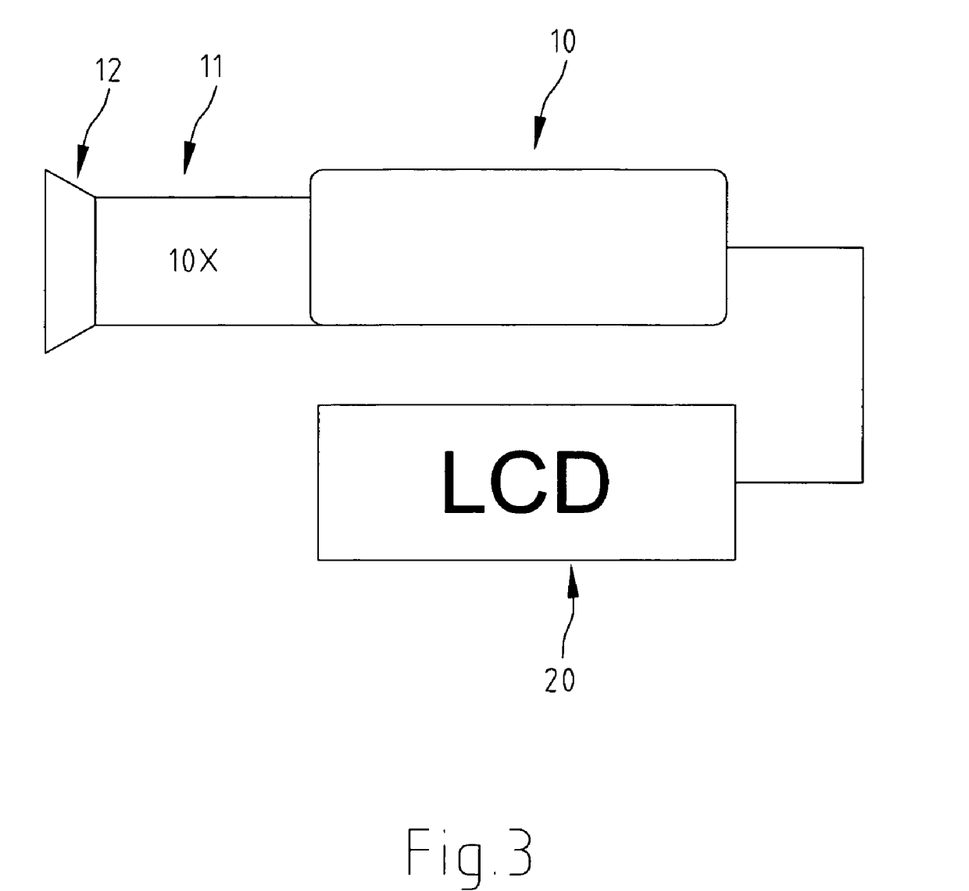
FIG. 3 is a side view of the driver-assisting apparatus shown in FIG. 1.

Referring to FIGS. 2 and 3, the camera 10 includes a zoom lens 11 and a wide-angle lens 12. The zoom lens 11 may be an optical or a digital type. Thus, the camera 10 can take and store clear pictures of objects in a field further than the driver's field of view with bare eyes.

The display 20 is connected with the camera 10 so that the pictures taken and stored by the camera 10 can be displayed by the display 20. The display 20 may be a liquid crystal display, a plasma display or a head-up display (see U.S. Pat. No. 6,262,848 B1).

Figure 4:
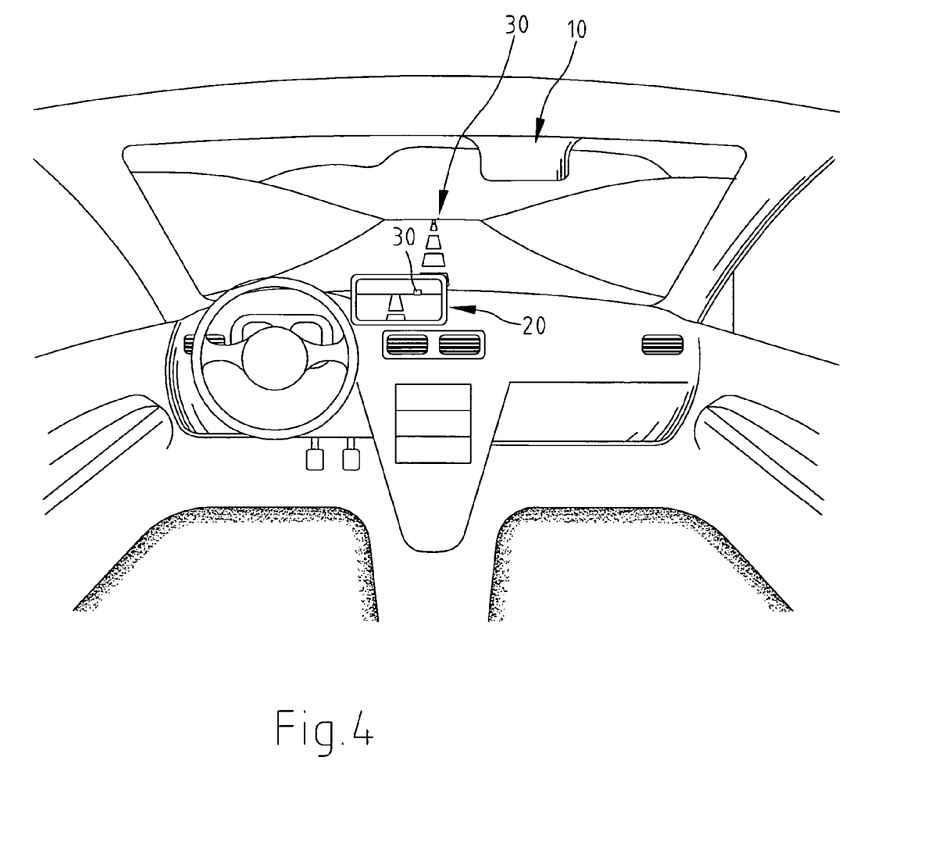
FIG. 4 provides a sight that a driver sees while driving a car equipped with the driver-assisting apparatus shown in FIG. 1.
Figure 5:
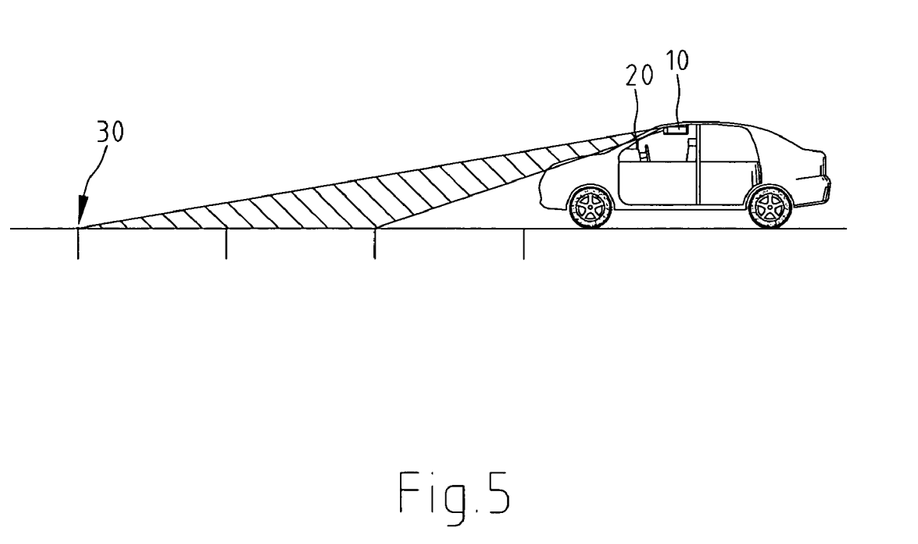
FIG. 5 is a side view of an object in front of the vehicle shown in FIG. 1.

Referring to FIGS. 4 and 5, when the sedan runs, the camera 10 keeps on taking pictures of objects in front of the sedan and the display 20 keeps on displaying the pictures. As illustrated, with the driver-assisting apparatus, the driver can see an object 30 that is too far for her or him to see with the bare eyes. The driver can take actions to avoid bumping into the object 30 earlier with the driver-assisting apparatus than without.

Figure 6:
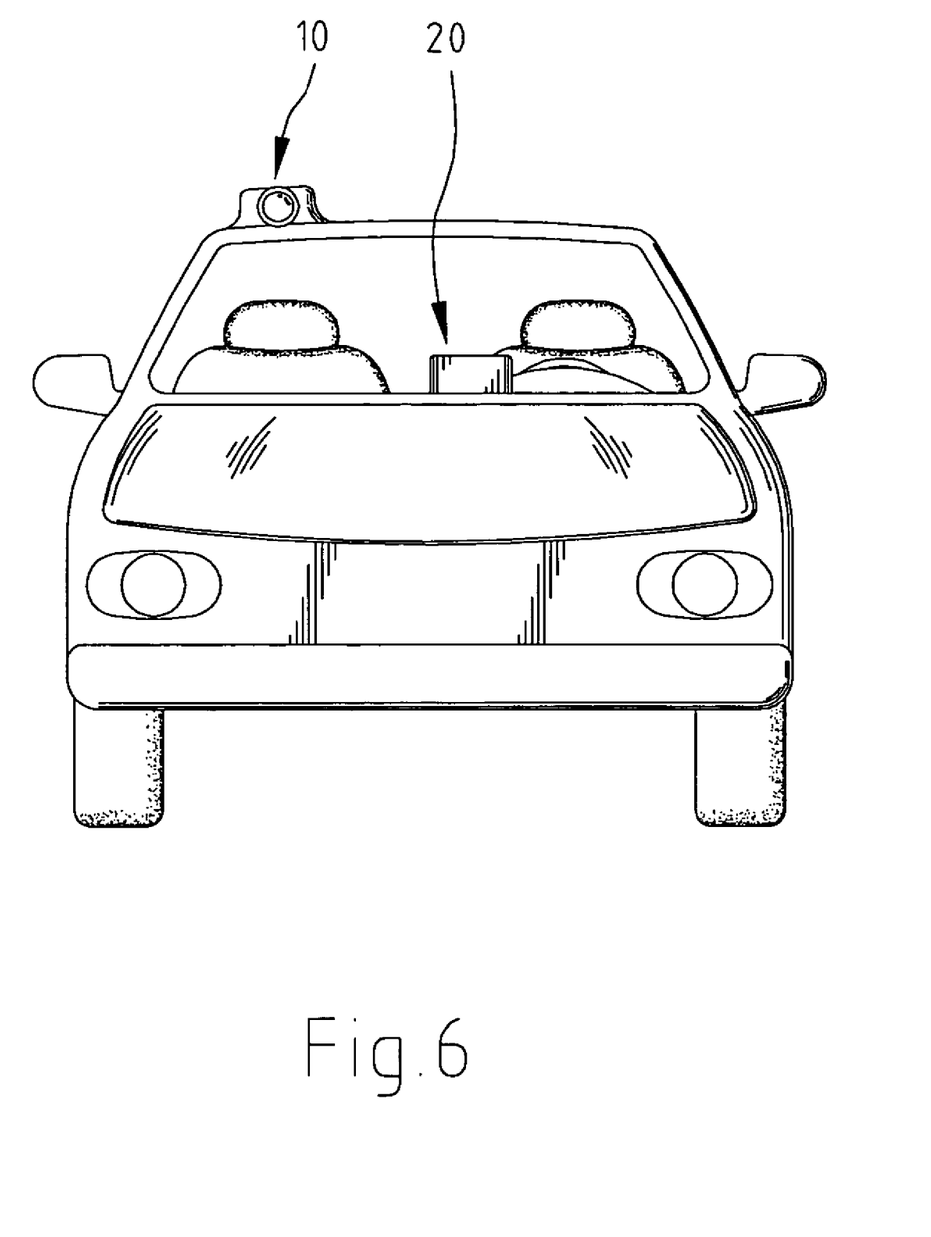
FIG. 6 is similar to FIG. 1 but shows the driver-assisting apparatus put in a different position on the sedan.

Referring to FIG. 6, the camera 10 is put on the roof of the sedan.

Figure 7:
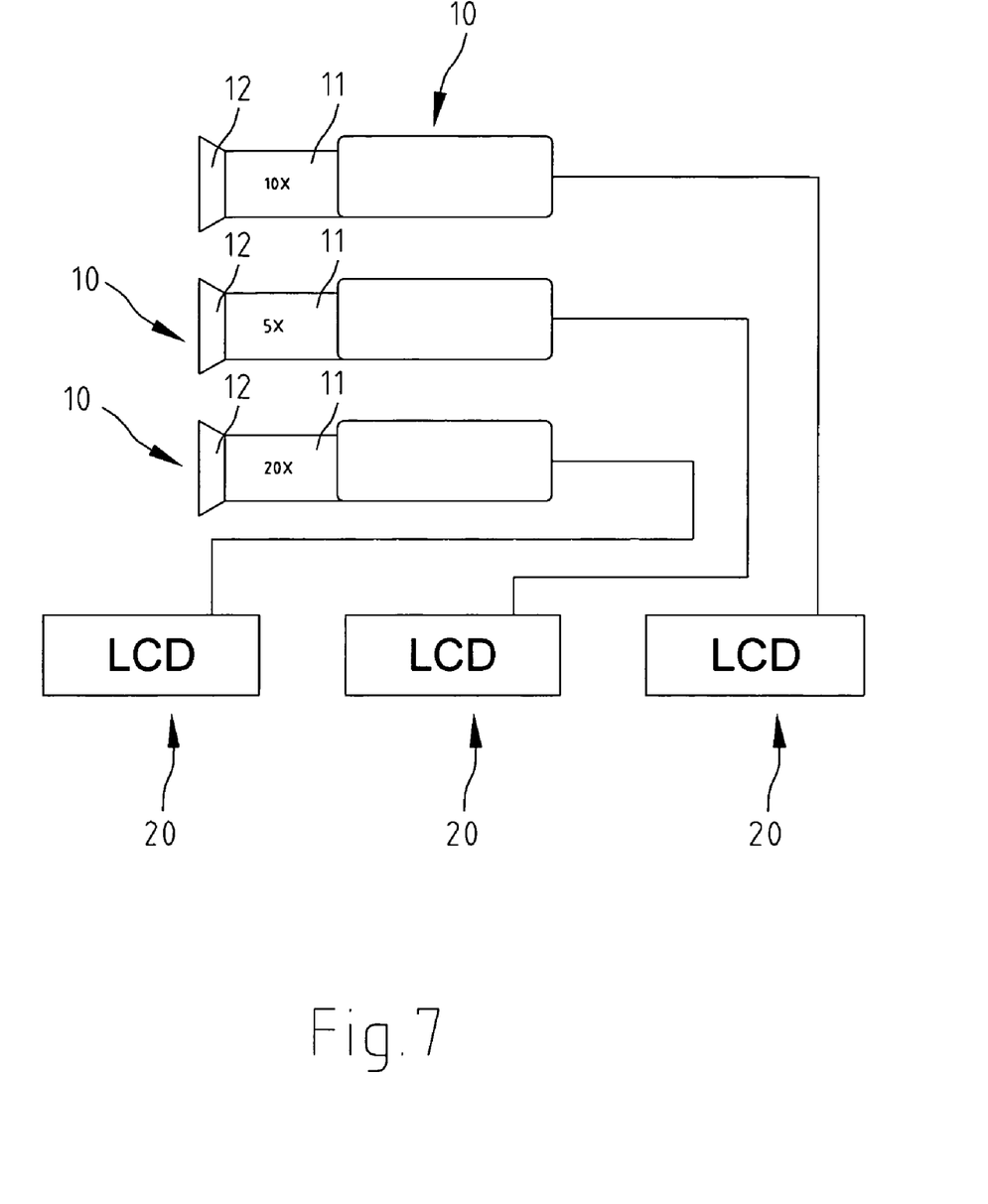
FIG. 7 is a side view of a driver-assisting apparatus according to a second embodiment of the present invention.

Referring to FIG. 7, according to a second embodiment of the present invention, a driver-assisting apparatus includes three cameras 10 and three displays 20 each connected with a related camera 10. The cameras 10 include different zoom lens. The first camera 10 may include a maximum magnification rate of 5×, the second camera 10× and the third camera 20×. Thus, the cameras 10 cover a very wide range.

When the sedan is driven at a speed with a first range, only the first camera 10 is turned on in order to take pictures in a first field further than the driver's field of view with the bare eyes. When the sedan is driven at a speed with a second range higher than the first range, the second camera 10 is turned on in addition to the first camera 10 in order to take pictures in a second area further than the first field. When the sedan is driven at a speed in a third range higher than the second range, the third camera 10 is turned on in addition to the second camera 10 in order to take pictures in a third area further than the second field.

Alternatively, the cameras 10 can be turned on simultaneously if there is no concern about consumption of energy.

Figure 8:
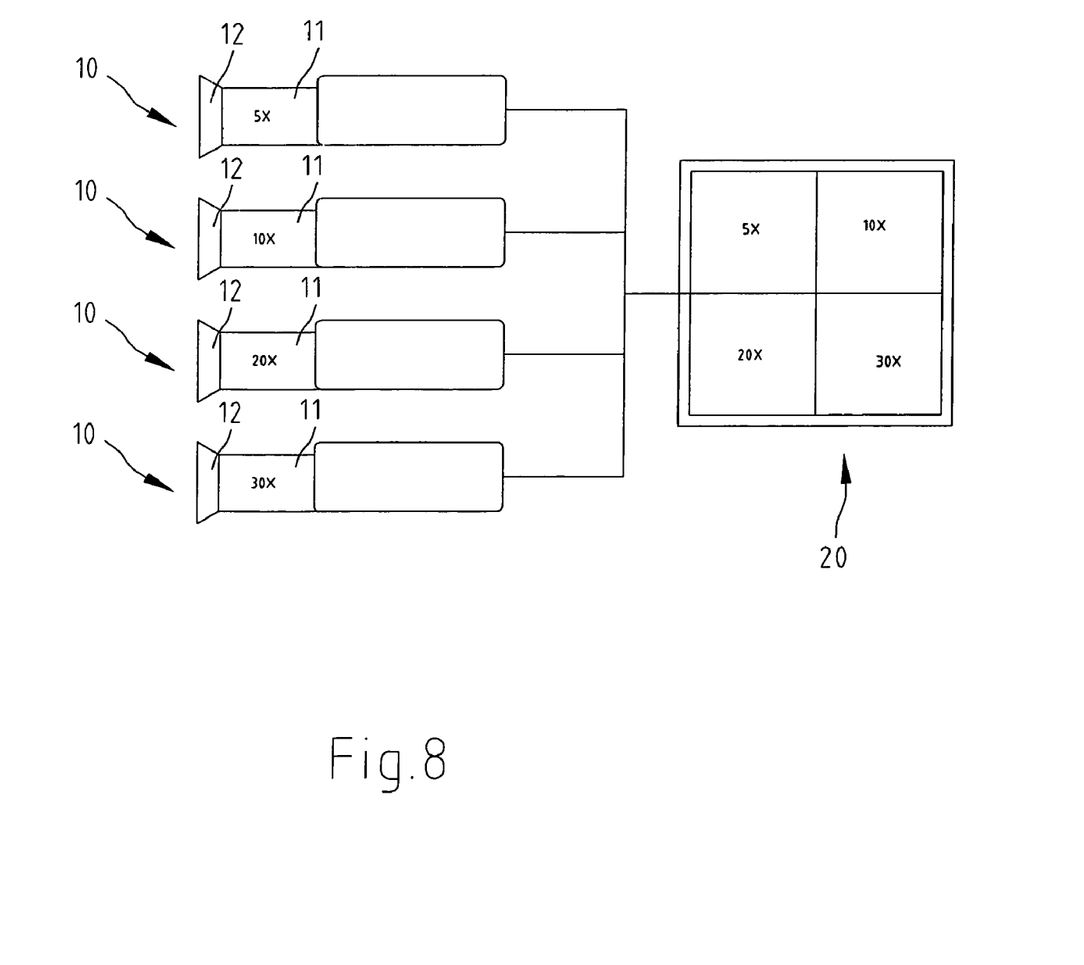
FIG. 8 is a side view of a driver-assisting apparatus according to a third embodiment of the present invention.

Referring to FIG. 8, according to a third embodiment of the present invention, a driver-assisting apparatus includes four cameras 10 and four displays 20 each connected with a related camera 10. The cameras 10 include different zooms. For example, the first camera 10 may include a maximum magnification rate of 5×, the second 10×, the third 20× and the fourth 30×. Thus, the cameras 10 cover a very wide range. The four displays 20 can be replaced with a single display with a screen divided into four frames.

Figure 9:
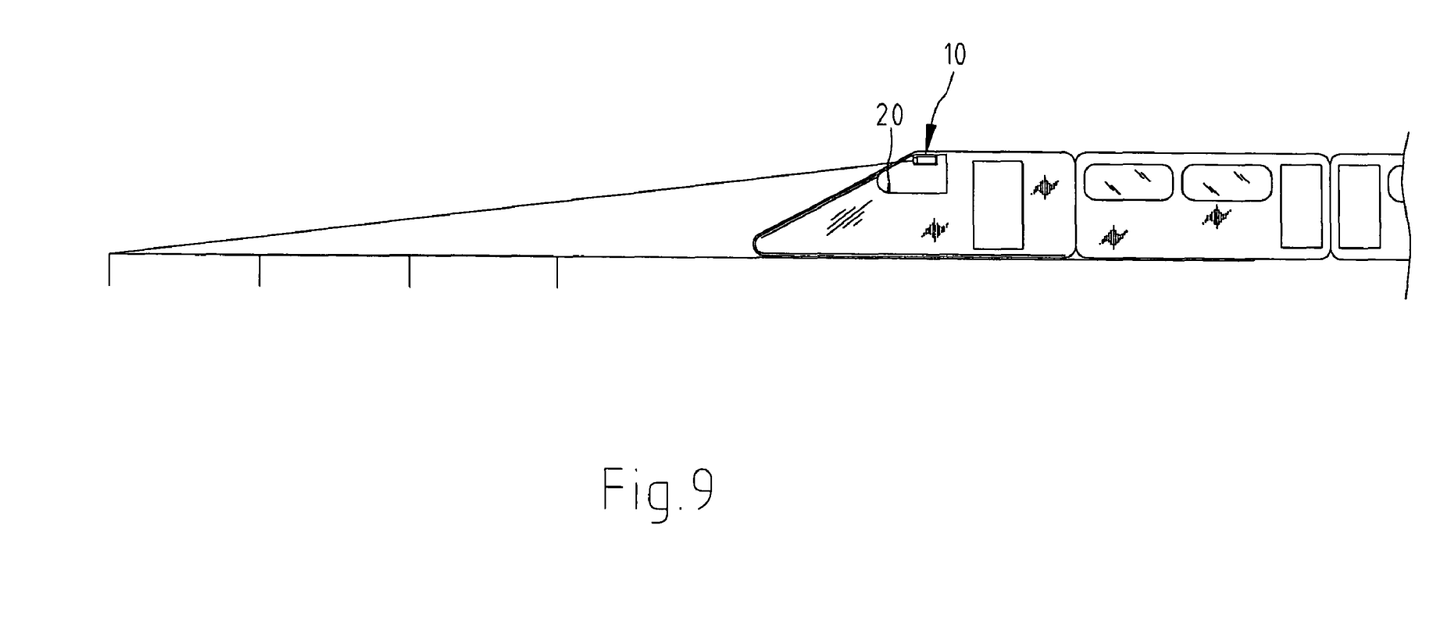
FIG. 9 is a side view of a train equipped with a driver-assisting apparatus according to the present invention.
Figure 10:
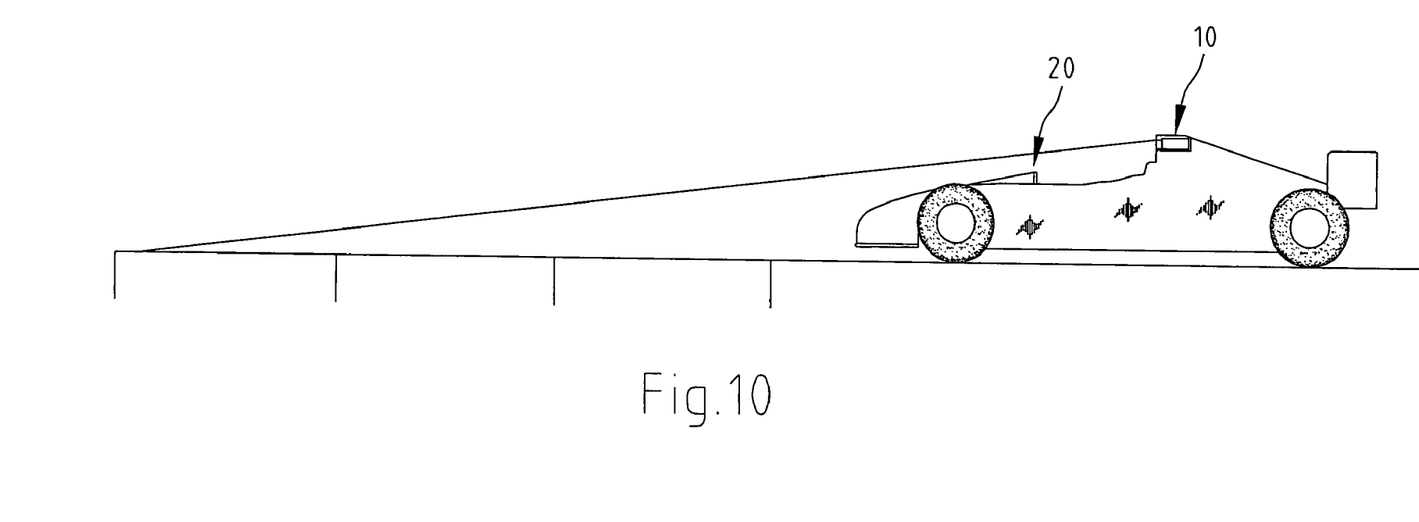
FIG. 10 is a side view of a racing car equipped with a driver-assisting apparatus according to the present invention.

The driver-assisting apparatus according to the present invention can be used in other types of vehicles such as a train shown in FIG. 9, a racing car shown in FIG. 10, a boat and an airplane.

The present invention has been described via detailed illustration of some embodiments. Those skilled in the art can derive variations from the embodiments without departing from the scope of the present invention. Hence, the embodiments shall not limit the scope of the present invention defined in the claims.

What is claimed is:

1. A driver-assisting apparatus comprising: multiple cameras attached to a vehicle for taking pictures in various front fields, with each camera taking pictures in a camera field of view that is different than other of the multiple cameras and further than a driver's front field of view; and at least one display connected with the multiple cameras for displaying the pictures overlapped onto the driver's front field of view, wherein the multiple cameras include first and second cameras, with the camera field of view of each of the multiple cameras corresponds to a unique vehicle speed range, with first camera having a first maximum magnification rate larger than a second maximum magnification rate of the second camera having a shorter camera field of view, and wherein the pictures of the multiple cameras are shown in the at least one display, whereby the multiple cameras have a capability of taking overlapped pictures in front of the driver's front field of view and showing the overlapped pictures to a driver by the at least one display to provide field information in front of and far away from the vehicle to the driver while the vehicle is driving at a high speed.

2. The driver-assisting apparatus according claim 1 wherein each camera comprises a zoom lens.

3. The driver-assisting apparatus according claim 2 wherein each camera comprises a zoom lens having a zoom at least 10×.

4. The driver-assisting apparatus according to claim 1 wherein the vehicle is a train.

5. The driver-assisting apparatus according to claim 1 wherein the vehicle is a racing car.

6. The driver-assisting apparatus according to claim 1 wherein the vehicle is a boat.

7. The driver-assisting apparatus according to claim 1 wherein the vehicle is an airplane.

8. The driver-assisting apparatus according to claim 1, wherein the multiple cameras includes a third camera having the camera field of view further than the camera field of view of the first camera and a third maximum magnification rate larger the first maximum magnification rate of the first camera.

9. The driver-assisting apparatus according to claim 8, wherein
the second maximum magnification rate of the second camera is 5×;
the first maximum magnification rate of the first camera is 10×; and
the third maximum magnification rate of the third camera is 20×.

10. The driver-assisting apparatus according to claim 9, wherein the multiple cameras include a fourth camera having a fourth maximum magnification rate;
the camera field of view of the fourth camera is further than the camera field of view of the third camera and the fourth maximum magnification rate is larger than the third maximum magnification rate of the third camera; and
the fourth maximum magnification rate of the fourth camera is 30×.

11. An optical assisting apparatus for a driver of a vehicle at a high speed comprising:
an optical assembly having a capability of taking and enlarging pictures of a scenery away from a driver's front field of view and comprising multiple optical devices each having a magnification rate to enlarge the pictures of the scenery; and
a display located near the driver's front field of view and having a capability of showing the enlarged pictures of the scenery to the driver to allow the driver having a vision beyond a normal visible field of the driver at a high speed of the vehicle, wherein
the magnification rates of the optical devices are different from each other to make the optical devices taking overlapped pictures in front of the driver's front field of view.

* * * * *